United States Patent
Zhu et al.

(10) Patent No.: US 11,653,289 B2
(45) Date of Patent: May 16, 2023

(54) SELECTION OF NETWORK SLICE DATA RATE

(71) Applicant: Apple Inc., Cupertino, CA (US)

(72) Inventors: Yifan Zhu, San Jose, CA (US); Krisztian Kiss, Hayward, CA (US); Srinivasan Nimmala, San Jose, CA (US); Utkarsh Kumar, Freemont, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/248,689

(22) Filed: Feb. 3, 2021

(65) Prior Publication Data

US 2021/0250845 A1 Aug. 12, 2021

Related U.S. Application Data

(60) Provisional application No. 62/975,583, filed on Feb. 12, 2020.

(51) Int. Cl.
| | |
|---|---|
| *H04W 48/06* | (2009.01) |
| *H04M 15/00* | (2006.01) |
| *H04W 8/08* | (2009.01) |
| *H04W 28/02* | (2009.01) |
| *H04W 48/16* | (2009.01) |
| *H04W 48/18* | (2009.01) |

(52) U.S. Cl.
CPC ........... *H04W 48/06* (2013.01); *H04M 15/66* (2013.01); *H04W 8/08* (2013.01); *H04W 28/0268* (2013.01); *H04W 48/16* (2013.01); *H04W 48/18* (2013.01)

(58) Field of Classification Search
CPC ... H04W 48/06; H04W 8/08; H04W 28/0268; H04W 48/16; H04W 48/18; H04W 76/12; H04W 76/18; H04W 28/22; H04W 4/70; H04M 15/66
See application file for complete search history.

(56) References Cited

U.S. PATENT DOCUMENTS

| | | | | |
|---|---|---|---|---|
| 10,939,333 | B2* | 3/2021 | Jin | H04W 76/18 |
| 2016/0249353 | A1* | 8/2016 | Nakata | H04L 45/50 |
| 2018/0132138 | A1* | 5/2018 | Senarath | H04L 47/78 |
| 2020/0112907 | A1* | 4/2020 | Dao | H04M 15/84 |
| 2020/0288351 | A1* | 9/2020 | Centonza | H04W 28/12 |

(Continued)

*Primary Examiner* — Abdullahi Ahmed
(74) *Attorney, Agent, or Firm* — Fay Kaplun & Marcin, LLP

(57) ABSTRACT

Manners of controlling a data rate for a user equipment (UE) on a per slice basis by either a core network or a radio access network (RAN). In one exemplary manner, a request is received to establish a new Protocol Data Unit (PDU) session for a network slice for a user equipment (UE), a maximum session throughput value is received for the new PDU session, the maximum session throughput value for the new PDU session is added to an accumulated maximum session throughput value to determine an updated accumulated maximum session throughput value, the updated accumulated maximum session throughput value is compared to a maximum slice throughput value and, when the updated accumulated maximum session throughput value exceeds the maximum slice throughput value, an action is performed related to the new PDU session.

20 Claims, 6 Drawing Sheets

(56) References Cited

U.S. PATENT DOCUMENTS

| | | | |
|---|---|---|---|
| 2021/0136548 A1* | 5/2021 | Mladin | H04W 48/18 |
| 2021/0144790 A1* | 5/2021 | Faccin | H04W 60/00 |
| 2021/0243641 A1* | 8/2021 | Gangakhedkar | H04L 47/28 |
| 2021/0368395 A1* | 11/2021 | Prabhakar | H04W 28/0257 |

* cited by examiner

SELECTION OF NETWORK SLICE DATA RATE

BACKGROUND

A user equipment (UE) may connect to a network that includes network slicing. Generally, network slicing refers to a network architecture in which multiple end-to-end logical networks run on a shared physical network infrastructure. Each network slice may be configured to serve a particular purpose. For example, the network may include a network slice configured to provide carrier services (e.g., voice, multimedia messaging service (MMS), Internet, etc.), a network slice configured to provide machine-type communications (MTC) services, a network slice configured to provide ultra-reliable low latency communications (URLLC) services, etc. Thus, each network slice may share network resources but facilitate different functionality.

To establish a connection to the network and perform the full scope of functionalities normally available to the UE via the network connection, the UE may camp on a cell of the network. Under conventional circumstances, the UE is not aware of whether a cell supports a particular network slice when the UE selects a cell to camp on. As a result, the UE may camp on a cell that does not support a network slice that the UE is configured to utilize.

SUMMARY

Some exemplary embodiments are related to a processor configured to perform operations. The operations include receiving a request to establish a new Protocol Data Unit (PDU) session for a network slice for a user equipment (UE), receiving a maximum session throughput value for the new PDU session, adding the maximum session throughput value for the new PDU session to an accumulated maximum session throughput value to determine an updated accumulated maximum session throughput value, comparing the updated accumulated maximum session throughput value to a maximum slice throughput value and when the updated accumulated maximum session throughput value exceeds the maximum slice throughput value, performing an action related to the new PDU session.

Other exemplary embodiments are related to a processor configured to perform operations. The operations include determining a maximum slice throughput value for a network slice for a user equipment (UE), determining an accumulated session throughput value for currently active Protocol Data Unit (PDU) sessions for the network slice for the UE, comparing the accumulated session throughput value to the maximum slice throughput value and when the accumulated session throughput value exceeds the maximum slice throughput value, throttling one of the active PDU sessions such that the accumulated session throughput value does not exceeds the maximum slice throughput value.

DETAILED DESCRIPTION

Figure 1:
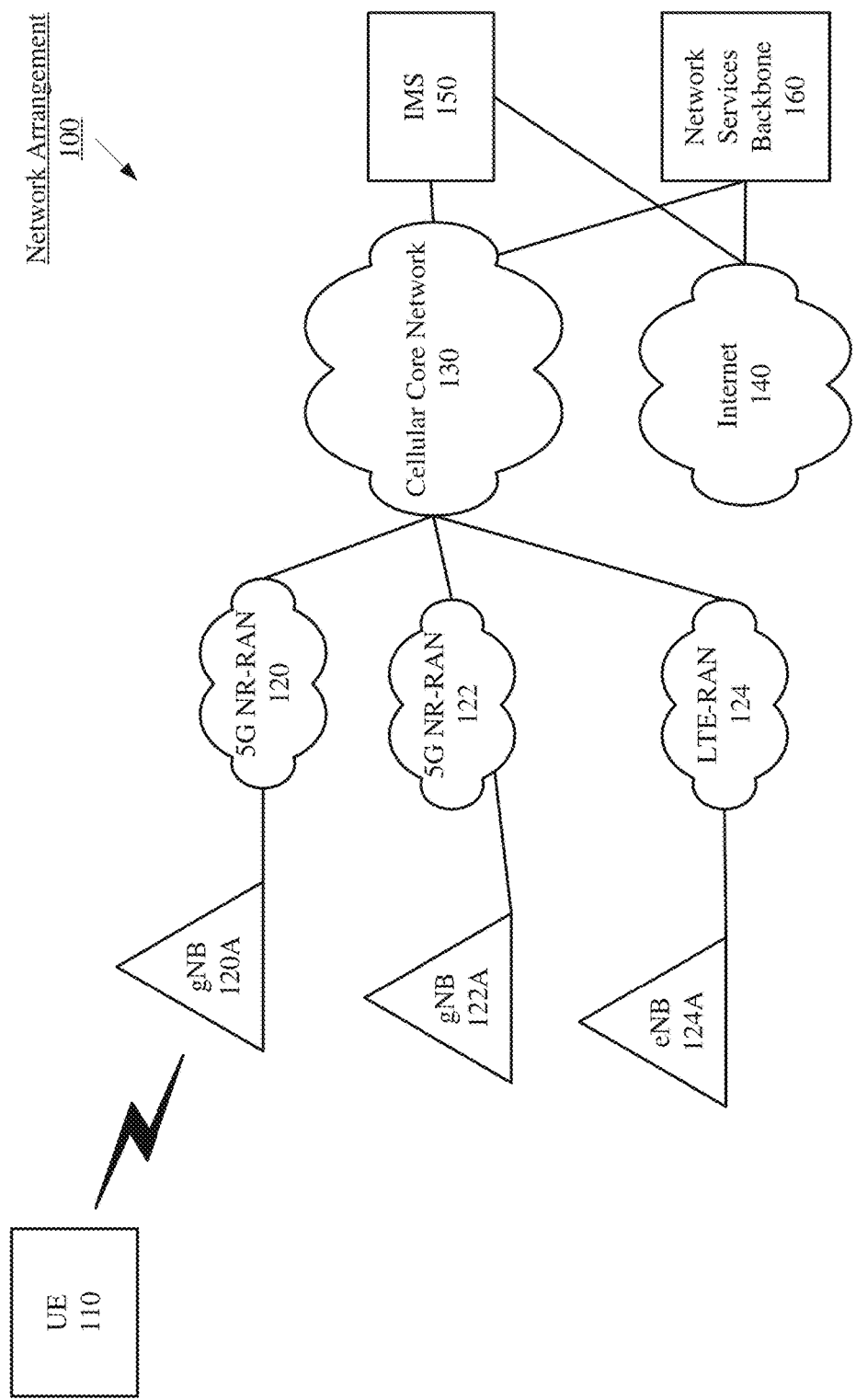
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing a manner to control the data throughput for a network slice. The exemplary embodiments may be used to control the data rate on a per slice basis. The exemplary embodiments include a static manner of controlling the data rate where the radio access network (RAN) is not involved, only the core network. The exemplary embodiments also include a dynamic manner of controlling the data rate based on the RAN enforcing the data rate.

The exemplary embodiments are described with regard to a fifth generation (5G) network that includes network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose.

Those skilled in the art will understand that 5G may support use cases such as enhanced mobile broadband (eMBB), massive machine type communication (mMTC) and ultra-reliable low latency communication (URLLC). Each of these types of use cases may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

As indicated above, a network slice may serve a wide variety of different purposes. However, the configured purpose of a network slice is beyond the scope of the exemplary embodiments. Thus, the exemplary embodiments are not limited to any particular type of network slice. Instead, the exemplary embodiments relate to selecting a data rate on a per slice basis.

As described above, the exemplary embodiments describe controlling a data rate for a network slice. It should be understood that the exemplary embodiments may apply to either or both of the downlink (DL) data rate or the uplink (UL) data rate for a slice. That is, as the exemplary embodiments are described below, the control of the data rates may be in either or both of the DL or UL.

Those skilled in the art will understand that 5G NR currently allows for a per PDU Session Aggregate Maximum Bit Rate ("Session-AMBR") and a per UE-AMBR. The exemplary embodiments relate to implementing a per network slice per UE AMBR. As will be described in greater detail below, the exemplary embodiments may be used to determine whether and how to limit the data rate of a UE for a network slice to ensure that the aggregate of the PDU sessions that use the slice are rate limited to the rate defined for the network slice in either or both of the DL or UL. The exemplary embodiments may also provider manners of signaling the rate limits for the network slice.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, eMTC devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are 5G New Radio (NR) radio access networks (5G NR-RAN) 120, 122 and a LTE-RAN 124. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 120, the 5G NR-RAN 122 or the LTE-RAN 124.

The 5G NR-RANs 120, 122 and the LTE-RAN 124 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The 5G NR-RANs 120, 122 may include architecture that is capable of providing both 5G NR RAT and LTE RAT services. For example, a next-generation radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, reference to the 5G NR-RANs 120, 122 and the LTE-RAN 124 are only provided for illustrative purposes, the exemplary embodiments may apply to any appropriate type of RAN.

Returning to the exemplary network arrangement 100, the UE 110 may connect to the 5G NR-RAN 120 via the next generation Node B (gNB) 120A, the 5G NR-RAN 122 via gNB 122A and the LTE-RAN 124 via the eNB 124A. Those skilled in the art will understand that any association procedure may be performed for the UE 110 to connect to the 5G NR-RAN 120, the 5G NR-RAN 122 or the LTE-RAN 124. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5 g NR-RAN 120). Similarly, for access to the 5G NR-RAN 122 the UE 110 may associate with gNB 122A and for access to the LTE-RAN 124, the UE 110 may associate with the eNB 124A.

In addition to the 5G NR-RANs 120, 122, and the LTE-RAN 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

As described above, the exemplary embodiments include a static manner of controlling the data rate where the radio access network (RAN) is not involved, only the core network. This exemplary embodiment is referred to as a static manner of controlling the data rate because it is based on the maximum AMBR of the slice and corresponding PDU sessions not the actual throughput for the slice. For example, a slice PDU session may have an AMBR of X. However, the actual throughput of the slice PDU session may be ½X. Because the core network 130 is not aware of the current actual throughput, the core network 130 will enforce the data throughput limits based on the session AMBR which is a static value. The signaling diagrams 200 and 300 of FIGS. 2 and 3, respectively, and the method diagram 400 are used to describe this type of exemplary embodiment. As will be described in greater detail below, in this exemplary embodiment, the enforcement of the per slice AMBR occurs each time a new Protocol Data Unit (PDU) session is established for the network slice.

Figure 2:
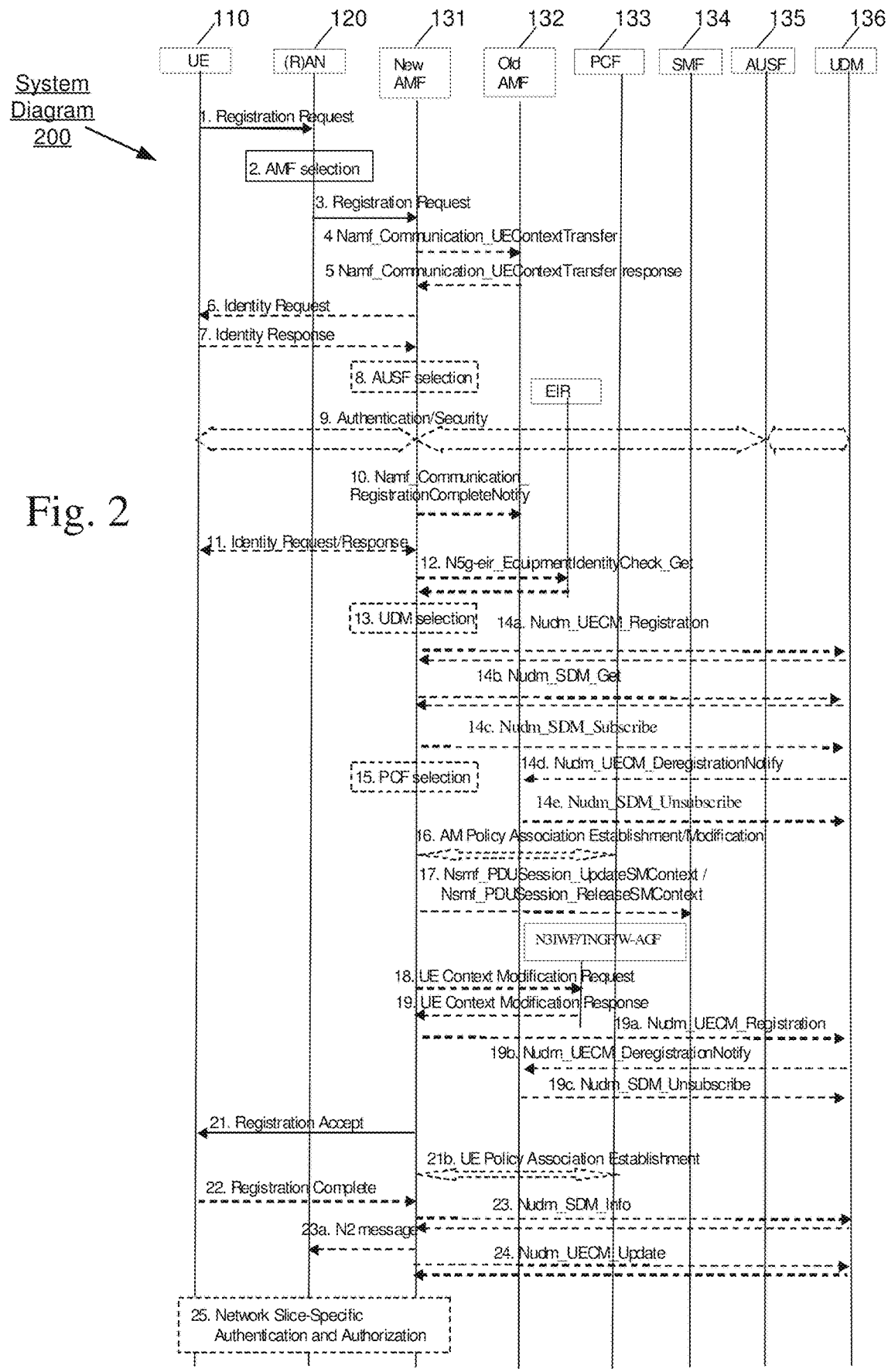
FIG. 2 shows an exemplary signaling diagram for a registration procedure for a UE to register with a network where either the core network enforces a data rate limit for network slices or the radio access network (RAN) enforces a data rate limit for network slices according to various exemplary embodiments.

FIG. 2 shows an exemplary signaling diagram for a registration procedure for a UE 110 to register with a network where either the core network 130 enforces a data rate limit for network slices or the radio access network (RAN) enforces a data rate limit for network slices according to various exemplary embodiments. In this exemplary embodiment, it may be considered that the core network 130 is enforcing the data rate limit.

Prior to discussing the signaling in FIG. 2, the specific components performing the signaling will be described. Starting from the left of FIG. 2, the first component is the UE 110 that was discussed above. The next component is the 5G NR-RAN 120. As discussed above, the UE 110 may connect to the 5G NR-RAN 120 via the gNB 120A or any other gNB associated with the 5G NR-RAN 120. In addition, as described above, the UE 110 may access the 5G NR-RAN 122 or the LTE-RAN 124. However, in this example it can be considered that the UE 110 will be registering via the 5G NR-RAN 120.

The remaining components/functionalities may be considered to reside in the core network 130. However, those skilled in the art will understand that these components/functionalities may reside in other portions of the network (e.g., the 5G NR-RAN 120) or may be distributed among various portions of the network. The next component is the Access and Mobility Management Function (AMF) 131. The AMF 131 is generally responsible for mobility management in the 5G NR-RAN 120. For example, the AMF 131 may be responsible for managing handovers between gNBs. The next component is a second AMF 132. Those skilled in the art will understand that a typical network will have multiple AMF functions and different UEs may be assigned to different AMFs. with the same AMF to reduce mobility management signaling.

The next component is a Policy Control Function (PCF) 133. The PCF 133 provides policy rules for control plane functions including network slicing, roaming and mobility management. The next component is a Session Management Function (SMF) 134. The SMF 134 may be responsible for creating, updating and removing Protocol Data Unit (PDU) sessions for UEs.

The next component is an Authentication Server Function (AUSF) 135. The AUSF 135 is generally responsible for subscriber authentication during registration or re-registration. The next component is a Unified Data Management (UDM) 136. The UDM 136 is generally responsible for providing data to the other functions. For example, the UDM 136 may provide the AMFs 131 and 132 and the SMF 134 with data to perform the corresponding functions. In another example, the UDM 136 may generate authentication vector for the AUSF 135. Those skilled in the art will understand that while each of these elements were referred to as components this does not mean that each is a discrete physical component. Rather, the functionalities of each of these components may be implemented in hardware, firmware or software by one or more network devices including cloud implementations.

Figure 4:
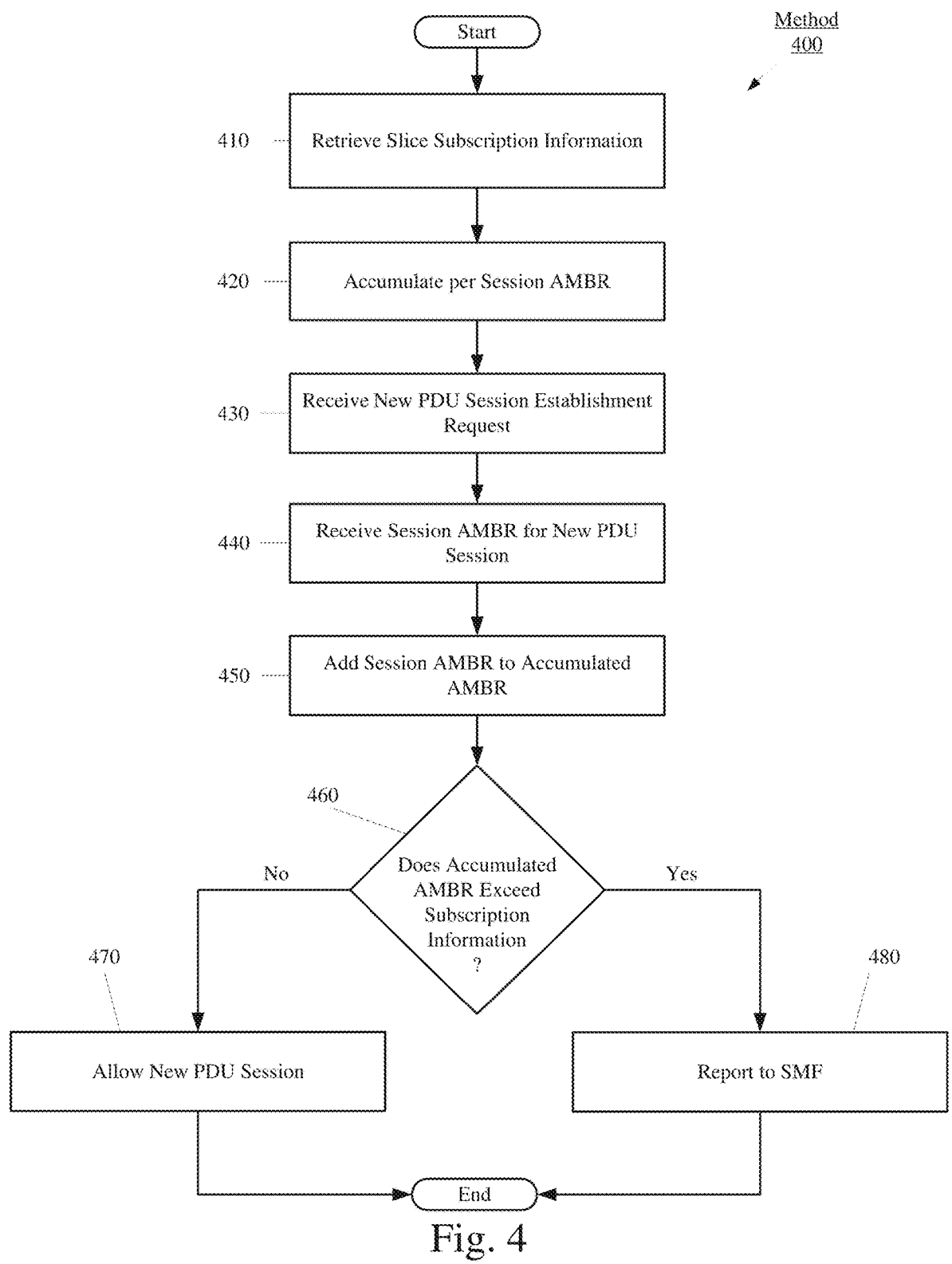
FIG. 4 shows an exemplary signaling method for a core network to enforce a data rate limit for network slices according to various exemplary embodiments.

The entirety of the registration of the signaling diagram 200 will not be described as those skilled in the art will understand that the signaling diagram 200 and the various signaling is similar to the signaling described by the registration procedure in 3GPP 23.502 Release 16.3.0 FIG. 4.2.2.2.2-1: Registration Procedure.

Rather, the description will focus on steps 14a-c of the registration procedure as that is where there are differences between the standard registration procedure as described in 3GPP 23.502 and the exemplary embodiments. Initially, a typical registration scenario in steps 14a-c will be described for a service such as Voice over PS (VoPS). In step 14a, the AMF 131 registers with the UDM 136 using the Nudm UECM Registration for the access to be registered. As part of this registration, the AMF 131 may provide the UDM with the services that are supported by the UE 110 (e.g., Voice over PS (VoPS)). However, the AMF 131 may not have the subscription information for the UE 110 e.g., whether the subscription associated with the UE 110 supports the VoPS service. If the AMF 131 does not have the subscription data for the UE 110, the AMF 131 retrieves the various subscription data for the UE 110 using the Nudm_SDM in step 14b. After receiving the subscription information, the AMF 131 may subscribe to be notified using Nudm_SDM Subscribe (step 14c) when the data requested is modified (e.g., the subscription information changes). Thus, in this manner, the AMF 131 may enforce the subscription information for the UE 110 during operation.

In the exemplary embodiments, the same manner of subscription enforcement may occur. For example, the UDM 136 may include the data rate limits per network slice in the UL and DL. The AMF 131, during the registration process for the UE 110, may retrieve this data rate limits per network slice information from the UDM 136. The AMF 131 may then enforce this limit when the UE 110 is connected to the network as will be described in greater detail below.

Figure 3:
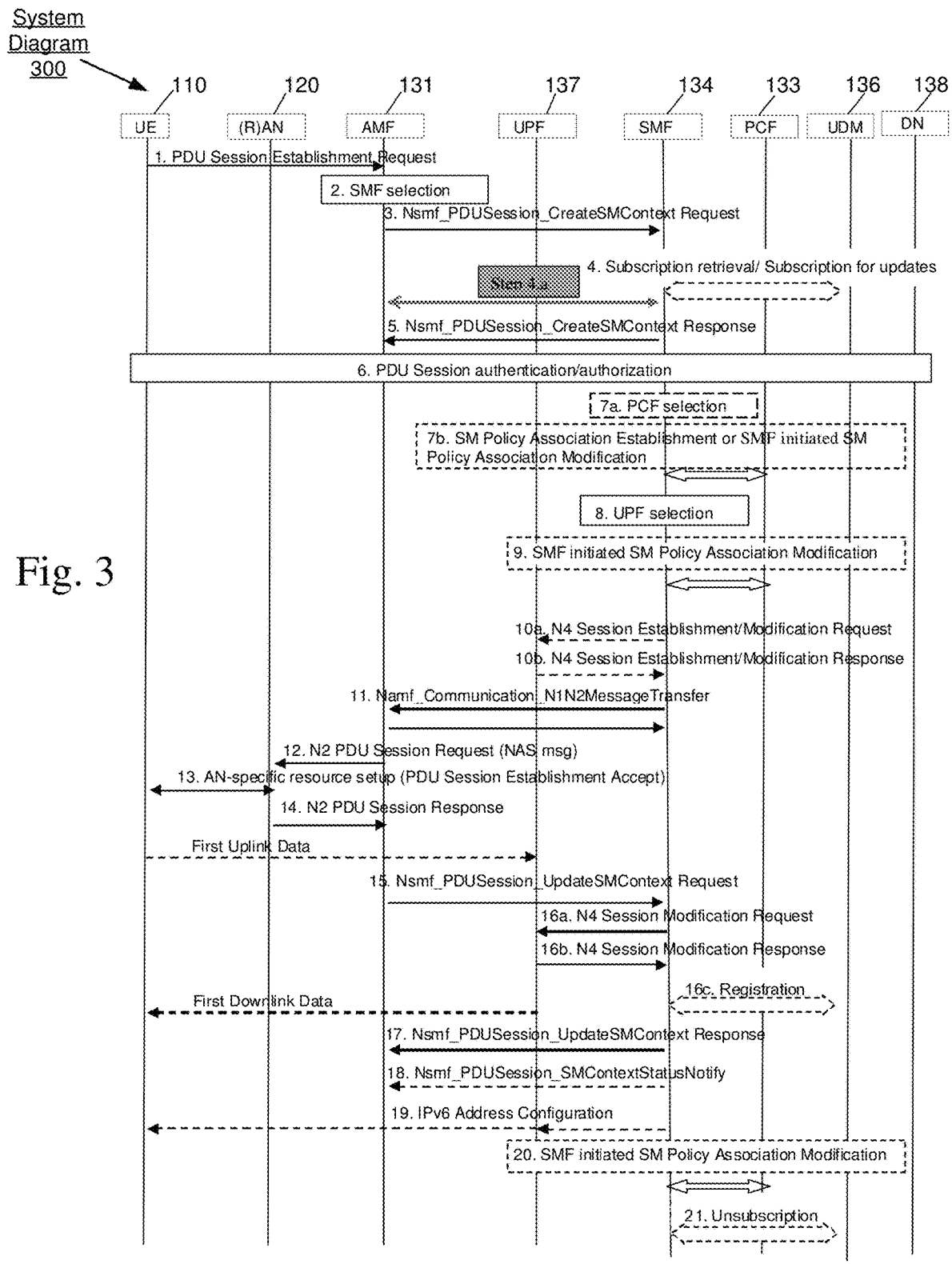
FIG. 3 shows an exemplary signaling diagram for a UE to establish a Protocol Data Unit (PDU) session for a network slice where the core network includes a data rate limit for network slices according to various exemplary embodiments.

FIG. 3 shows an exemplary signaling diagram 300 for a UE 110 to establish a Protocol Data Unit (PDU) session for a network slice where the core network 130 includes a data rate limit for network slices according to various exemplary embodiments. There are two components in signaling diagram 300 that are not included in signaling diagram 200 and these components will be briefly described before describing the signaling diagram 300. The core network 130 also includes a User Plane Function (UPF) 137. The UPF 137 performs packet routing and forwarding, packet inspection and QoS handling. The core network 130 also includes a data network (DN) 138. These components are not described in any further detail because they are not involved in the specific modification of the PDU establishment procedure described with respect to the signaling diagram 300.

Again, similar to the signaling diagram 200, the entirety of the PDU session establishment procedure of the signaling diagram 300 will not be described as those skilled in the art will understand that the signaling diagram 300 and the various signaling is similar to the signaling described by the PDU session establishment procedure in 3GPP 23.502 Release 16.3.0 FIG. 4.3.2.2.1-1 UE-requested PDU Session Establishment for non-roaming and roaming with local breakout.

Rather, the description will focus on the new step 4a of the PDU session establishment procedure as that is where there are differences between the standard PDU session establishment procedure as described in 3GPP 23.502 and the exemplary embodiments. In step 4a, the SMF 134 will send the session AMBR to the AMF 131. That is, the SMF 134 will provide the AMF with the session AMBR for the new PDU session that is attempting to be established. The AMF 131 will accumulate the per session AMBR from all the currently active PDU sessions as well as the new PDU session. The AMF 131 may then compare the accumulated value with the data rate limit (e.g., that was retrieved from the UDM 136 during the registration procedure as described above). If the accumulated AMBR for all the PDU sessions does not exceed the data rate limit, the AMF 131 will allow the PDU session to be established. If the accumulated AMBR exceeds the data rate limit, the AMF 131 will report this to the SMF 134. The SMF 134 may then either reject the PDU session establishment or cap the session AMBR for the new PDU session such that the accumulated AMBR does not exceed the data rate limit.

FIG. 4 shows an exemplary method 400 for a core network 130 to enforce a data rate limit for network slices according to various exemplary embodiments. The exemplary method 400 will be described with reference to the exemplary network arrangement 100 of FIG. 1 and the signaling diagrams 200 and 300 of FIGS. 2 and 3, respectively. The exemplary method 400 is described from the perspective of the AMF 131.

In 410, the AMF 131 retrieves the subscription information from the UDM 136 during the network registration procedure that is performed for the UE 110. As described above, the UDM 136 may store the subscription information that includes the per slice AMBR limit per UE. In 420, the AMF 131 may accumulate the per session AMBR per slice per UE for any active PDU sessions for the UE 110.

In 430, the AMF 131 receives a new slice PDU session establishment request from the UE 110. As described above, the AMF 131 then receives the session AMBR for the new PDU session from the SMF 134 in 440. The AMF 131 then adds the session AMBR for the new PDU session with the current accumulated AMBR in 450. In 460, the AMF 141 may then compare the accumulated AMBR (including the session AMBR for the new PDU session) to the subscription information that was retrieved in 410. If the accumulated AMBR does not exceed the total per slice AMBR of the subscription information, the AMF 131 allows the new PDU session to be established in 470. However, if the accumulated AMBR exceeds the total per slice AMBR of the subscription information, the AMF 131 will report this information to the SMF 134 in 480. The SMF 134 may then either reject the new PDU session establishment or cap the session AMBR for the new PDU session such that the accumulated AMBR does not exceed the data rate limit.

Thus, it can be seen from the above that the exemplary embodiments described with reference to FIGS. 2-4 provide a manner for the core network to control per slice AMBR limits per UE.

As described above, the exemplary embodiments also include a dynamic manner of controlling the data rate based on the RAN enforcing the data rate. The signaling diagrams 200 and 500 of FIGS. 2 and 5, respectively, and the method diagram 600 are used to describe this type of exemplary embodiment. As will be described in greater detail below, in this exemplary embodiment, the per slice AMBR is enforced by the RAN (e.g., 5G NR-RAN 120) based on the aggregated bit rate from all the non-GBR (non-guaranteed bit rate) QoS flows belonging to the network slice.

FIG. 2 shows an exemplary signaling diagram for a registration procedure for a UE 110 to register with a network where either the core network 130 enforces a data rate limit for network slices or the radio access network (RAN) enforces a data rate limit for network slices according to various exemplary embodiments. In this example, it may be considered that the RAN and specifically the 5G NR-RAN 120 is enforcing the data rate limits. FIG. 2 will not be described again because it is the same for this exemplary embodiment as described above for the other exemplary embodiment. That is, the UDM will store the subscription information associated with the UE 110 for the network slice, e.g., the maximum AMBR per slice per UE that is associated with the UE 110. The AMF 131 will retrieve this information during the registration procedure.

Figure 5:
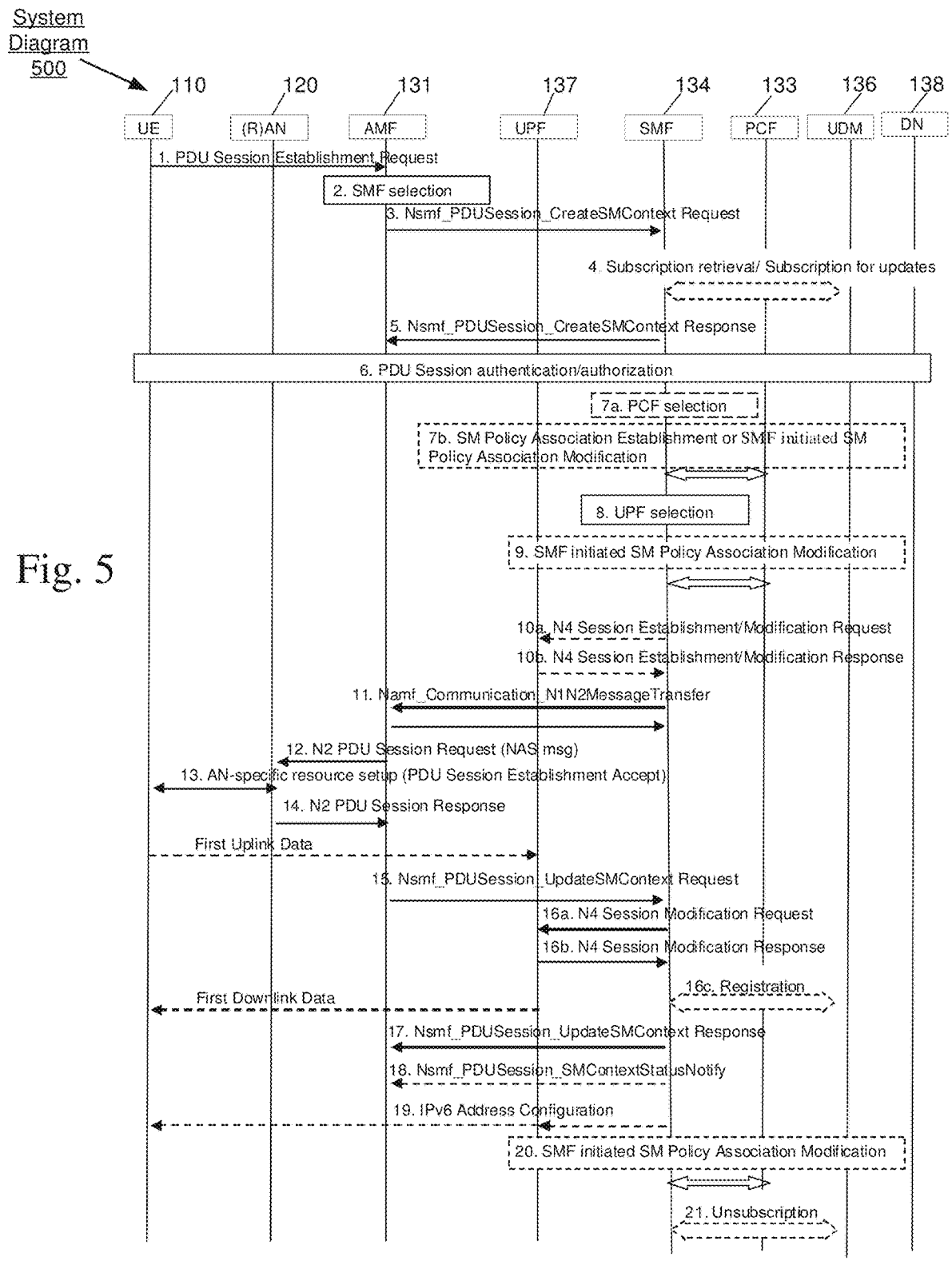
FIG. 5 shows an exemplary signaling diagram for a UE to establish a Protocol Data Unit (PDU) session for a network slice where the RAN enforces a data rate limit for network slices according to various exemplary embodiments.

FIG. 5 shows an exemplary signaling diagram 500 for a UE 110 to establish a Protocol Data Unit (PDU) session for a network slice where the RAN enforces a data rate limit for network slices according to various exemplary embodiments. Again, similar to the signaling diagram 300, the signaling diagram 500 and the various signaling is similar to the signaling described by the PDU session establishment procedure in 3GPP 23.502 Release 16.3.0 FIG. 4.3.2.2.1-1 UE-requested PDU Session Establishment for non-roaming and roaming with local breakout. Thus, the entirety of the signaling will not be described but rather the portions that are different from the PDU establishment procedure described in 3GPP 23.502.

When establishing the PDU session the 5G NR-RAN 120 will receive the Quality of Service (QoS) profiles and the single network slice selection assistance information (s-NS-SAI) (e.g., the network slice with which the PDU session is associated). In the exemplary embodiments, in steps 11 and 12, the 5G NR-RAN will also associate the QoS profiles with the corresponding QoS Flow Identifier (QFI) with the s-NSSAI.

With this information, the 5G NR-RAN 120 may then enforce the per slice AMBR for the network slice. That is, the 5G NR-RAN 120 has received the information corresponding to the data rate limits per network slice for the network slice from the AMF 131 during the registration procedure. This enforcement mechanism by the 5G NR-RAN 120 may be considered to be dynamic because the PDU session will not be rejected. Rather, the PDU session is established and the 5G NR-RAN 120 may then monitor the aggregated bit rate for the particular slice in any time measurement window. If the aggregated bit rate exceeds the subscription information, the 5G NR-RAN 120 may lower the data rates for one or more of the active PDU sessions for the slice to keep the bit rate below the threshold associated with the subscription data rate limit.

Figure 6:
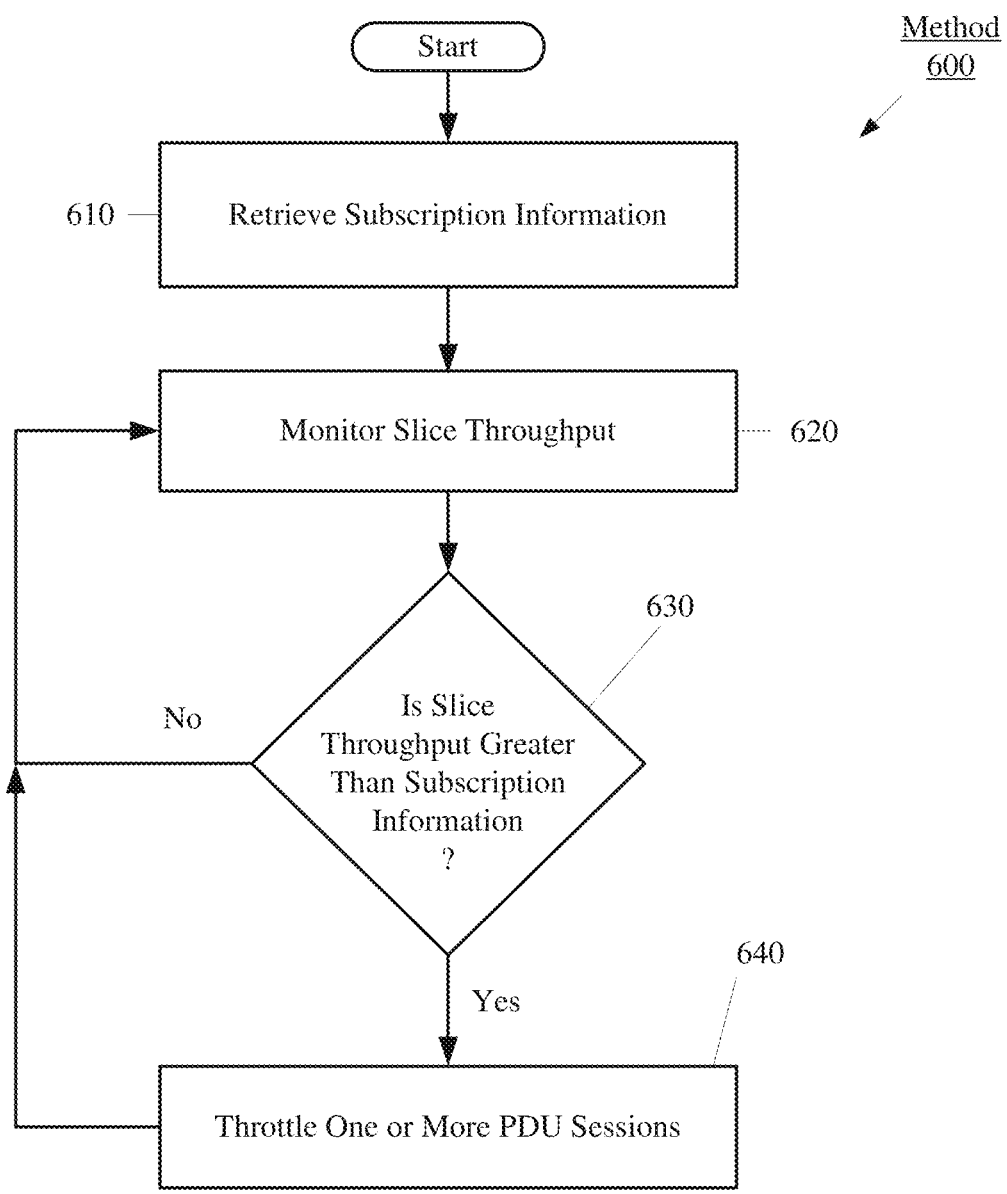
FIG. 6 shows an exemplary method for a RAN to enforce a data rate limit for network slices according to various exemplary embodiments.

FIG. 6 shows an exemplary method 600 for a RAN to enforce a data rate limit for network slices according to various exemplary embodiments. The exemplary method 600 will be described with reference to the exemplary network arrangement 100 of FIG. 1 and the signaling diagrams 200 and 500 of FIGS. 2 and 5, respectively. The exemplary method 600 is described from the perspective of the 5G NR-RAN 120.

In 610, the 5G NR-RAN 120 retrieves the subscription information for the UE 110 related to the network slice. As described above, during the registration procedure, the AMF 131 will receive the subscription information from the UDM 136. The AMF 131 may then send this subscription information to the 5G NR-RAN 120 during the registration procedure. The subscription information may include the per slice data rate limit per UE.

In 620, the 5G NR-RAN 120 may monitor the throughput for the particular network slice. As described above, the slice throughput will include the accumulated throughput for all currently active slice PDU sessions for the UE 110. This throughput may be measured for a defined measurement window. In this exemplary embodiment, the RAN (e.g., 5G NR-RAN) may enforce the data throughput limits for the network slice because the 5G NR-RAN 120 is the entity that is aware of the total throughput (either UL or DL) for the UE 110 for the particular slice on a real time basis.

In 630, the 5G NR-RAN 120 may compare the accumulated throughput to the subscription information, e.g., the data rate limit for the network slice for the UE 110. If the current slice throughput is greater than the limit, the 5G NR-RAN may throttle one or more of the PDU sessions corresponding to the network slice and UE 110 to drop the accumulated throughput to below the data rate limit for the network slice in 640. If the current slice throughput is less than the limit, the 5G NR-RAN will continue back to 620 and continue to monitor the accumulated throughput for the network slice and compare it to the limit (630) for as long as the network slice remains active for the UE 110.

Thus, it can be seen from the above that the exemplary embodiments described with reference to FIGS. 2 and 5-6 provide a manner for the RAN to control per slice data rate limits per UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   receiving a request to establish a new Protocol Data Unit (PDU) session for a network slice for a user equipment (UE);
   receiving a maximum session throughput value for the new PDU session;
   adding the maximum session throughput value for the new PDU session to an accumulated maximum session throughput value to determine an updated accumulated maximum session throughput value;
   comparing the updated accumulated maximum session throughput value to a maximum slice throughput value; and
   when the updated accumulated maximum session throughput value exceeds the maximum slice throughput value, performing an action related to the new PDU session.

2. The method of claim 1, further comprising:
   determining the maximum slice throughput value for the network slice for the UE; and
   determining, prior to receiving the request to establish the new PDU session, the accumulated maximum session throughput value for currently active PDU sessions for the network slice for the UE.

3. The method processor of claim 1, wherein the action comprises:
   rejecting the new PDU session.

4. The method of claim 1, wherein the action comprises:
   establishing the new PDU session with a second maximum session throughput value that is lower than the maximum session throughput value.

5. The method of claim 4, wherein the second maximum session throughput value is set such that a sum of the second maximum session throughput value and the accumulated maximum session throughput value is less than the maximum slice throughput value.

6. The method of claim 1, further comprising:
   when the updated accumulated maximum session throughput value does not exceed the maximum slice throughput value, establishing the new PDU session.

7. The method of claim 1, wherein the maximum slice throughput value is for one of a downlink (DL) to the UE or an uplink (UL) from the UE.

8. The method of claim 1, wherein the method is performed by a core network.

9. The method of claim 8, wherein the method is performed by an Access and Mobility Management Function (AMF) or a Policy Control Function (PCF) of the core network.

10. The method of claim 1, wherein the determining the maximum slice throughput value for the network slice is determined during a registration procedure for the UE.

11. A method, comprising:
    determining a maximum slice throughput value for a network slice for a user equipment (UE);
    determining an accumulated session throughput value for currently active Protocol Data Unit (PDU) sessions for the network slice for the UE;
    comparing the accumulated session throughput value to the maximum slice throughput value; and
    when the accumulated session throughput value exceeds the maximum slice throughput value, throttling one of the active PDU sessions such that the accumulated session throughput value does not exceeds the maximum slice throughput value.

12. The method of claim 11, further comprising:
    when the accumulated session throughput value does not exceed the maximum slice throughput value, continuing to determine the accumulated session throughput value for currently active Protocol Data Unit (PDU) sessions for the network slice for the UE.

13. The method of claim 11, wherein the accumulated session throughput value is determined for a specified measurement window.

14. The method of claim 11, wherein the maximum slice throughput value is for one of a downlink (DL) to the UE or an uplink (UL) from the UE.

15. The method of claim 11, wherein the method is performed by one of (a) a radio access network (RAN) for a downlink (DL) or an uplink (UL), or (b) the UE for the UL.

16. The method of claim 11, wherein the determining the maximum slice throughput value for the network slice is determined during a slice PDU session establishment procedure for the UE.

17. The method of claim 11, wherein the determining the maximum slice throughput value for the network slice comprises:
    receiving a Quality of Service (QoS) profile and a single network slice selection assistance information (s-NSSAI) for the network slice with which the PDU sessions are associated.

18. The method of claim 17, further comprising:
    associating the QoS profiles with a corresponding QoS Flow Identifier (QFI) with the s-NSSAI.

19. The method of claim 11, wherein the throttling one of the active PDU sessions comprises throttling more than one of the active PDU sessions.

20. The method of claim 19, further comprising:
prioritizing throttling for non-Guaranteed Bit rate (CBR) PDU sessions.

* * * * *

UNITED STATES PATENT AND TRADEMARK OFFICE
CERTIFICATE OF CORRECTION

PATENT NO. : 11,653,289 B2
APPLICATION NO. : 17/248689
DATED : May 16, 2023
INVENTOR(S) : Zhu et al.

Page 1 of 1

It is certified that error appears in the above-identified patent and that said Letters Patent is hereby corrected as shown below:

In the Claims

Claim 20, Column 11, Line 2:
"prioritizing throttling for non-Guaranteed Bit rate (CBR)" should read as "prioritizing throttling for non-Guaranteed Bit rate (GBR)"

Signed and Sealed this
Twenty-seventh Day of June, 2023

Katherine Kelly Vidal
*Director of the United States Patent and Trademark Office*